Sept. 17, 1940.  W. JÄHDE ET AL  2,214,856
RESISTANCE WELDING MACHINE
Filed July 13, 1938
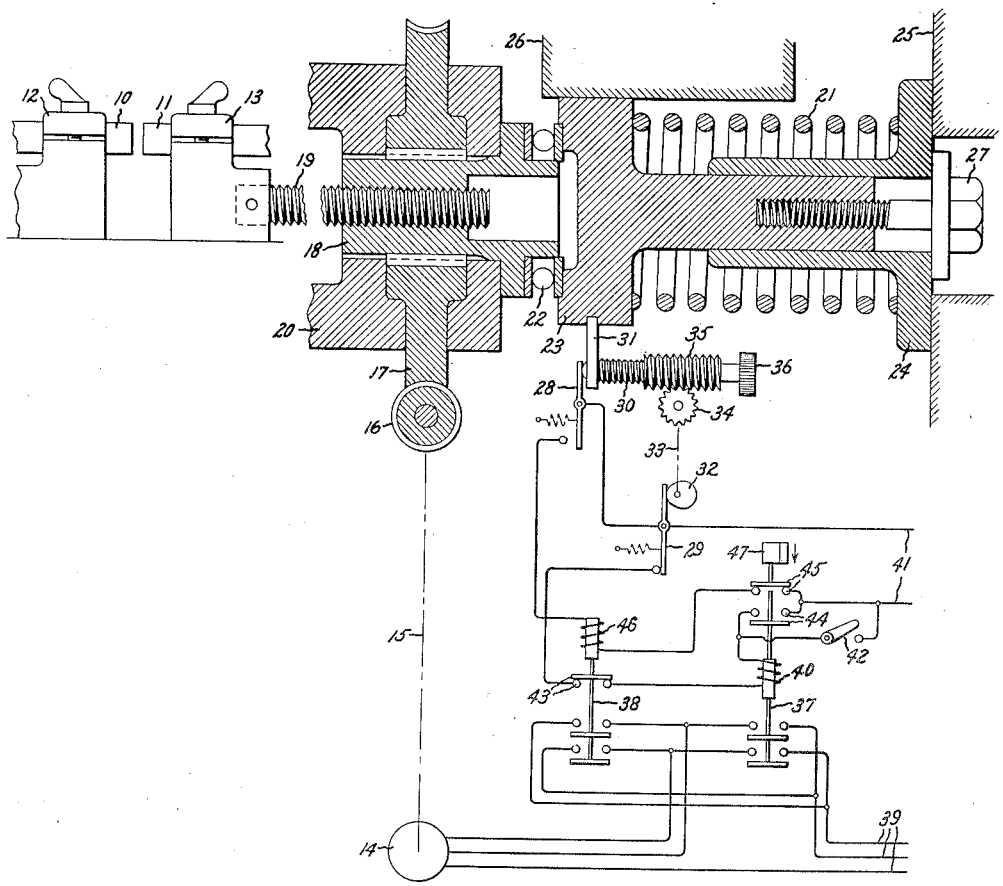
Inventors:
Werner Jähde,
Otfried Plass,
by Harry E. Dunham
Their Attorney.

Patented Sept. 17, 1940

2,214,856

UNITED STATES PATENT OFFICE 2,214,856

RESISTANCE WELDING MACHINE

Werner Jähde, Niederneuendorf, Berlin, and Otfried Plass, Hennigsdorf Kreis Osthavelland, Germany, assignors to General Electric Company, a corporation of New York Application July 13, 1938, Serial No. 219,052
In Germany July 21, 1937

8 Claims. (Cl. 219—4)

Our invention relates to resistance welding and more particularly to machines for performing automatically resistance welding operations.

In such machines, the electrodes are usually moved toward and away from one another by means of a motor mechanism between which and one of the electrodes an elastic intermediate link, for example a spring, is connected. In machines heretofore used, after the termination of a welding operation, this elastic link is left under stress until the work pieces are removed from the electrodes. This stressing of the elastic link for comparatively long periods of time is not desirable and, furthermore, greatly complicates the release of the work pieces.

It is an object of our invention to provide an automatic resistance welding machine in which the work parts are forced together by a motor acting through an elastic intermediate link and in which, after the elastic link has been stressed a predetermined amount, the motor mechanism is reversed until the elastic link is completely relieved of this predetermined stress.

It is another object of our invention to provide an automatic machine in which the predetermined upsetting pressure is maintained for a predetermined time interval before the motor mechanism is reversed to relieve the elastic link through which pressure is applied to the electrodes during the welding operation.

Further objects of our invention will become apparent from the following description of one embodiment thereof diagrammatically illustrated in the attached drawing.

In the attached drawing, our invention has been shown as applied in a machine for effecting an automatic flash welding operation. The work parts 10 and 11 are clamped in electrodes 12 and 13 which are moved toward and away from one another by an electric motor 14. This motor is connected through a shaft 15, a worm 16, a worm wheel 17, a nut 18, and a spindle 19 to the movable electrode 13. The nut 18 is threaded on the spindle 19 and is movable bodily relative to the worm wheel 17 which is held by a support 20 in fixed position relative to the worm 16. When the direction of rotation of the motor 14 is such that the spindle 19 is fed to the left until further movement in this direction is impossible by reason of the work parts 10 and 11 engaging one another, the nut 18 then moves to the right against the action of the spring 21 which as it is stressed applies a welding pressure to the work parts 10 and 11. The nut 18 acts on the spring 21 through a thrust bearing 22 which engages one of two telescoping members 23 and 24 between the flanges of which the spring 21 is located. The reaction of the spring is taken by a wall 25 on which one of the members 24 is supported, and the other member 23 is guided by a surface 26. The initial tension of the spring 21 is controlled by a bolt 27 which determines the initial separation of the flanged members 23 and 24 between which the spring 21 is located.

The automatic control of the feed motor 14 is accomplished through a circuit including limit switches 28 and 29. Limit switch 28 is actuated by an adjustable stop 30 which comprises a screw threaded into a member 31 attached to the flange of the member 23. Limit switch 29 is actuated by a cam 32 which is connected by a shaft 33 to a spur gear 34 which engages a worm gear 35 mounted on the screw 30. The adjustment of the screw 30 in the member 31 is accomplished through a knurled knob 36.

The worm 35 on the adjusting screw 30 permits an independent adjustment of limit switch 28 relative to limit switch 29. The position of the screw 30 determines the adjustment of limit switch 28 and the position of cam 32 on shaft 33 determines the adjustment of limit switch 29. These limit switches are biased by springs to circuit closing positions. Limit switch 28 is opened when the pressure exerted by the spring 21 on electrode 13 is substantially zero and the limit switch 29 is opened after the spring 21 has been deformed a certain amount corresponding to the maximum electrode pressure desired in performing a welding operation.

The direction of rotation of the motor 14 is controlled by forward and reverse electromagnetic switches 37 and 38 which control the phase connections of the motor with a source of supply 39. These switches are electrically interlocked so that energization of one precludes the energization of the other. The electromagnetic switch 37 is provided with an operating coil 40 which may be connected across a source of control potential 41 through a switch 42, control contacts 43 of electromagnetic switch 38 and limit switch 29. Once this electromagnetic switch is operated, a holding circuit is completed for its operating coil through its control contacts 44. The operation of the electromagnetic switch 37 opens its control contacts 45 thus opening the energizing circuit for the operating coil 46 of electromagnetic switch 38. A predetermined time interval after switch 37 opens, control contacts 45 of switch 37 close under the action of a time delay means 47. If the limit switch 28 is closed, the operating circuit for coil 46 of the electromagnetic switch 38 is completed through these control contacts 45 and the limit switch 28 to the source of supply 41.

The machine operates in the following manner: The operator closes the switch 42 thus energizing the operating coil 40 of the electromagnetic switch 37 which connects the motor 14 to the source of supply 39 for rotation in a direction which will advance the electrodes 12 and 13 toward one another and eventually bring the work pieces 10 and 11 into engagement with one another. In flash welding, the final firm engagement between the work parts will be preceded by a sparking engagement which may be controlled by the operator who by opening and closing switch 42 may secure the desired rate of feed during "flashing." When the switch 42 is finally left in a closed position and the work pieces 10 and 11 firmly engage one another at the end of the welding operation, the forward travel of the spindle 19 is arrested and the nut 18 travels to the right on this spindle against the pressure exerted by the spring 21. Upon the initial deformation of this spring the limit switch 28 is closed and after the spring 21 has been deformed to an amount which exerts the desired final electrode pressure on the work parts, the limit switch 29 is opened. The opening of the limit switch 29 deenergizes the electromagnetic switch 37 which opens the circuit between the motor 14 and the source of supply 39. A predetermined time interval after the electromagnetic switch 37 has opened, its control contacts 45 close to complete the energization circuit for the operating coil 46 of electromagnetic switch 38. The closing of this switch reverses the direction of rotation of the motor 14 which by the reverse rotation of the nut 18 on the spindle 19 relieves the pressure of the spring 21 until at substantially zero pressure the limit switch 28 is opened. The opening of limit switch 28 deenergizes the electromagnetic switch 38 and the operation of the motor is arrested with the pressure between the work parts substantially zero. The opening of limit switch 28 and the consequent opening of the electromagnetic switch 38 prepares through the control contacts 43 of switch 38 the energizing circuit for the operating coil 40 of the electromagnetic switch 37 which circuit is completed by the closure of switch 42 when the welding operator is ready to initiate another welding operation.

The relief of spring pressure accomplished in the above machine greatly facilitates removal of the work parts from the electrode clamps. Furthermore, the automatic stressing of the spring 21 to obtain maximum electrode pressure for a predetermined interval of time places the spring under stress only so long as is necessary for completing the welding operation.

In the embodiment illustrated in the drawing, the elastic link which is used to effect the control of the electrode feed motor and thus the electrode pressure, has been illustrated as a spring. It is to be understood that any suitable substitute may be used therefor such as a rubber block or similar elastic deformable material. It is also to be understood that although our invention has been described in connection with a flash welding machine that it is not limited to this particular application of resistance welding since the same control may also be employed for other forms of resistance butt welding or for spot welding. By proper control of the time delay closing of contacts 45 associated with electromagnetic switch 37 the control could also be used for controlling the pressure applied to the electrodes of a line welding machine.

In a machine embodying our invention, it is to be understood that suitable controls are employed for controlling the application and interruption of the welding current. Since this forms no part of our present invention the control employed for current control has not been illustrated in the drawing or described above.

In view of the above description of one embodiment of our invention, other embodiments thereof will be apparent to those skilled in the art. We, therefore, aim to cover in the appended claims all modifications which fall within the true spirit and scope of our invention.

What we claim as new and desire to secure by Letters Patent of the United States is:

1. A resistance welding machine comprising electrodes, means including an elastic link for moving said electrodes toward and away from one another, and means responsive to the deformation of said elastic link for controlling said last-mentioned means to exert a predetermined pressure between said electrodes and thereafter to remove said pressure.

2. A resistance welding machine comprising relatively movable electrodes, a motor for controlling the relative movement of said electrodes, an elastic link responsive to electrode pressure and deformable in accordance with the pressure applied to said electrodes by said motor, means effective before said elastic link is deformed a substantial amount for energizing said motor to move said electrodes towards one another, means responsive to a predetermined deformation of said elastic link for reversing said motor, and means for stopping said motor when the forces producing deformation in said elastic link have been substantially removed.

3. A resistance welding machine comprising relatively movable electrodes, a motor for controlling the relative movement of said electrodes, an elastic link responsive to electrode pressure and deformable in accordance with the pressure applied to said electrodes by said motor, means effective before said elastic link is deformed a substantial amount for energizing said motor to move said electrodes towards one another, means responsive to a predetermined deformation of said elastic link for deenergizing said motor and after a predetermined time interval reversing said motor, and means for stopping said motor when the forces producing deformation in said elastic link have been substantially removed.

4. A resistance welding machine comprising relatively movable electrodes, a motor for controlling the relative movement of said electrodes, means for energizing said motor to move said electrodes together, and means responsive to electrode pressure for reversing said motor when said electrode pressure attains a predetermined value and for stopping said motor when said electrode pressure has been reduced substantially to zero.

5. A resistance welding machine comprising relatively movable electrodes, a motor for controlling the relative movement of said electrodes, means for energizing said motor to move said electrodes together, and means responsive to electrode pressure for stopping said motor when said electrode pressure attains a predetermined value and thereafter reversing said motor after a predetermined time interval and for stopping said motor when said electrode pressure has been reduced substantially to zero.

6. A resistance welding machine comprising relatively movable electrodes, an electric motor for controlling the relative movement of said electrodes, an elastic link responsive to electrode pressure and deformable in accordance with the pressure applied to said electrodes by said motor, means including electromagnetic switches for energizing and controlling the direction of rotation of said electric motor, and means including limit switches respectively responsive to substantially zero deformation of said elastic link and to a predetermined deformation of said elastic link for controlling the energization of said electromagnetic switches.

7. A resistance welding machine comprising relatively movable electrodes, an electric motor for controlling the relative movement of said electrodes, an elastic link responsive to electrode pressure and deformable in accordance with the pressure applied to said electrodes by said motor, means including forward and reverse electromagnetic switches for energizing and controlling the direction of rotation of said electric motor, the operating coil of each of said switches being connected through control contacts of the other of said switches so that the energization of one of said switches precludes the energization of the other of said switches, and means for energizing the operating coils of said electromagnetic switches including a limit switch in circuit with the operating coil of said forward electromagnetic switch and a second limit switch in circuit with the operating coil of said reverse electromagnetic switch, said first-mentioned limit switch having contacts biased into engagement with one another and separated in response to a predetermined deformation of said elastic link and said second limit switch having contacts biased into engagement with one another and separated in response to substantially zero deformation of said elastic link.

8. A resistance welding machine comprising relatively movable electrodes, an electric motor for controlling the relative movement of said electrodes, an elastic link responsive to electrode pressure and deformable in accordance with the pressure applied to said electrodes by said motor, means including forward and reverse electromagnetic switches for energizing and controlling the direction of rotation of said electric motor, the operating coil of each of said switches being connected through control contacts of the other of said switches so that the energization of one of said switches precludes the energization of the other of said switches, means for energizing the operating coils of said electromagnetic switches including a limit switch in circuit with the operating coil of said forward electromagnetic switch and a second limit switch in circuit with the operating coil of said reverse electromagnetic switch, said first-mentioned limit switch having contacts biased into engagement with one another and separated in response to a predetermined deformation of said elastic link and said second limit switch having contacts biased into engagement with one another and separated in response to substantially zero deformation of said elastic link, and means for delaying the operation of said reverse electromagnetic switch for a predetermined interval of time after said forward electromagnetic switch has been deenergized by the operation of said first-mentioned limit switch.

WERNER JÄHDE.
OTFRIED PLASS.